United States Patent

Carr

Patent Number: 5,113,529
Date of Patent: May 19, 1992

[54] EYEGLASSES VISOR AND RETAINER

[76] Inventor: J. Scott Carr, 6011-201 Winterpointe Dr., Raleigh, N.C. 27606

[21] Appl. No.: 619,088

[22] Filed: Nov. 28, 1990

Related U.S. Application Data

[63] Continuation-in-part of Ser. No. 502,249, Mar. 30, 1990.

[51] Int. Cl.⁵ .............. G02C 5/00; G02C 11/00; A61F 9/00
[52] U.S. Cl. .................................. 2/13; 2/12
[58] Field of Search ............ 2/13, 10, 171, 185 R, 2/186, 190, 191, 192, 199, 200

[56] References Cited

U.S. PATENT DOCUMENTS

| | | | |
|---|---|---|---|
| 2,541,242 | 2/1951 | Grove | 2/13 |
| 2,691,165 | 10/1954 | Kane | 2/13 |
| 2,724,834 | 11/1955 | Henderson et al. | 2/13 |
| 2,795,793 | 6/1957 | Sommers | 2/13 |
| 3,014,221 | 12/1961 | Brunetto | 2/200 X |
| 3,029,438 | 4/1962 | Henschel | 2/200 X |
| 3,237,204 | 3/1966 | Honsaker | 2/13 |
| 3,366,971 | 2/1968 | Scherz | 2/200 X |
| 3,596,290 | 8/1971 | Kennedy | 2/13 |
| 4,335,471 | 6/1982 | Quigley, Jr. et al. | 2/200 X |
| 4,370,756 | 2/1983 | Gallin | 2/200 X |
| 4,606,077 | 8/1986 | Phillips | 2/200 X |
| 4,606,453 | 8/1986 | Burns | 2/13 X |
| 4,771,477 | 9/1988 | Cahill | 2/200 X |
| 4,850,054 | 7/1989 | Sulton | 446/27 X |
| 4,852,186 | 8/1989 | Landis | 2/10 X |
| 4,945,573 | 8/1990 | Landis | 2/10 X |

FOREIGN PATENT DOCUMENTS 652728  11/1937  Fed. Rep. of Germany ............ 2/13

Primary Examiner—Werner H. Schroeder
Assistant Examiner—Jeanette E. Chapman

[57] ABSTRACT

The present invention entails a sun visor adapted to be attached to the temples of an eyeglass. In particular, the sun visor is constructed of a pliable material and includes a set of slits on each side of the sun visor. The sun visor is secured to the temples of the eyeglass by weaving the temples through the respective slits of each set formed in the sun visor. In one embodiment disclosed, the sun visor is formed by securing a first panel to a second panel and wherein one panel is formed from a material that has a relatively low friction property while the other material has a relatively high friction property.

5 Claims, 1 Drawing Sheet

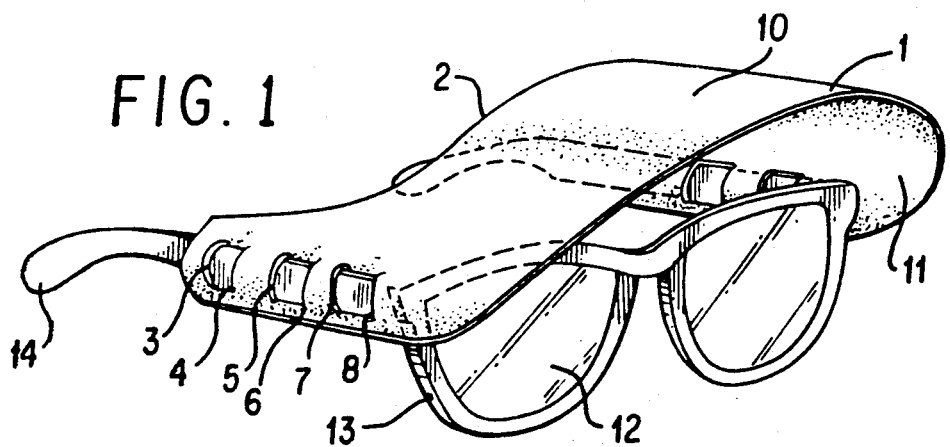
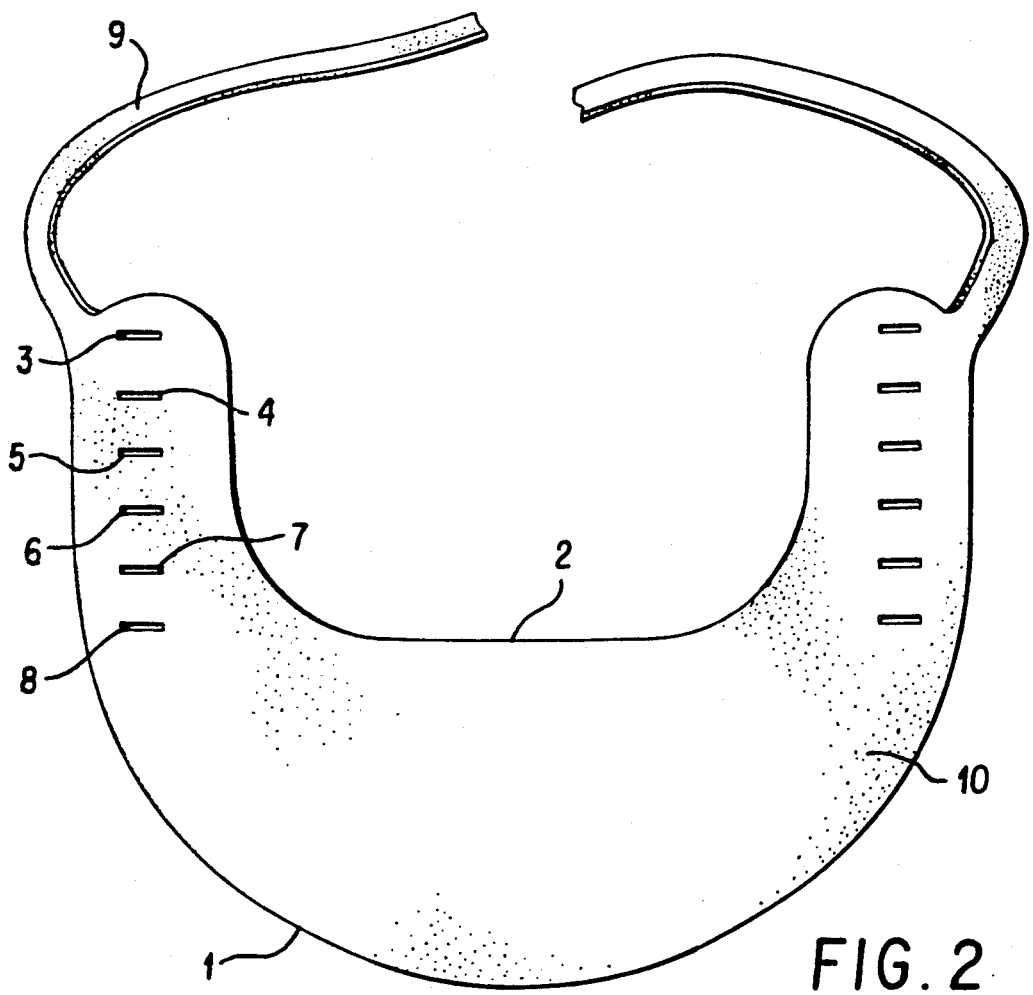
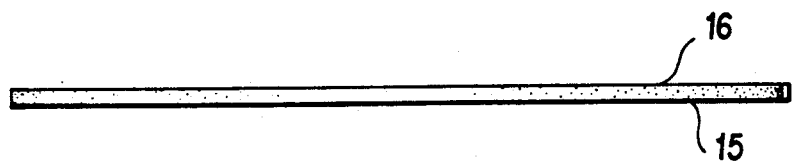

EYEGLASSES VISOR AND RETAINER

RELATED APPLICATIONS

This is a continuation-in-part of U.S. patent application Ser. No. 502,249 filed Mar. 30, 1990.

BACKGROUND OF THE INVENTION

1. Field of the Invention

The invention relates to sun visors, more particularly, to sun visors adapted to be attached to eyeglass temples via a weaving mechanism.

2. Prior Art

Many attempts have been made to provide sun visors to be worn with eyeglasses. These devices have worked in many instances, but attractive, sturdy, and low cost eyeglass sun visors which will be held comfortably and effectively during active use, are still desired.

U.S. Pat. No. 4,543,667 and 4,606,453 illustrate sun visors that use elastic loops to hold them in place on the eyeglass temples. This means of attachment requires that the eyeglass temples be larger than the loops for a good hold. These prior art attempts use only the front most part of the eyeglass temples to secure the visor. This makes the eyeglasses front heavy, therefore prone to fall off during active use. The materials that comprise these attempts are a cardboard stiffening member and a cloth cover. This configuration does not provide a durable weather-proof eyeglass sun visor.

OBJECT OF THE INVENTION

It is the object of the instant invention to provide a sun visor that can be removably mounted to the temples of eyeglasses.

Another object of the invention is to provide slots in the bill to form a weaving mechanism, thus providing stable attachment to the eyeglasses reguardless of position or width of the eyeglass temples.

Still another object of the invention is to provide a retaining strap as part of the bill to hold the eyeglasses and visor around the neck when not in use or to be adjusted to hold the eyeglasses and visor tightly to the head during active use.

It is an object of the present invention to provide a sun visor design of the character referred to above that is constructed of material that lends itself to the convenient weaving or insertion of the temples through the slots and at the same time tends to grip the structure of the temples such that the sun visor as a whole is held firmly in place about the eyeglass temple.

Another object of the present invention is to provide a sun visor of the character referred to above which includes an upper surface that is relatively slick or frictionless and a bottom surface that does exhibit frictional characteristics such that when the temples are pushed through the slots of the sun visor, the relatively slick or frictionless surface enables the temples to freely slide across this upper surface while the bottom surface, which is the frictional surface, tends to retain the temples within the slots after the temples have been inserted.

Other objects and advantages of the present invention will become apparent and obvious from a study of the following description and the accompanying drawings which are merely illustrative of such invention.

BRIEF DESCRIPTION OF DRAWINGS

FIG. 1 is a perspective view of a sun visor according to the instant invention wherein the sun visor is seen attached to a pair of eyeglasses;

FIG. 2 is a top view of the sun visor showing the retaining strap and weaving slots.

FIG. 3 is a front elevational view of a second embodiment of the sun visor of the present invention.

DETAILED DESCRIPTION OF THE INVENTION

Referring now to the drawings, and first to FIG. 1, there is shown the sun visor, generally designated (10), mounted on a pair of eyeglasses having lenses (12), rims (13), and foldable side temples (14), as per conventional design. Referring now to FIG. 2, there is shown a top view of visor (10) detached from the eyeglasses. Visor (10) is constructed generally of an elastomeric material such as neoprene such that it forms a curved shape when attached to the eyeglasses. The visor (10) has an inner concave edge (2), forming the back side which is placed next to forehead when in use; and an outer convex edge (1) which forms front side and extends away from forehead when in use. The concave and convex sides meet to form right side and left side which correspond in size to a distance slightly wider than typical eyeglasses. On the right side and left side of visor (10), there are slots, generally designated (3-8) for one side; the other side having similar slots. The visor (10) is attached to the eyeglasses by weaving temple (14) through slots (3-8).

Referring back to FIG. 1, there is shown temple (14) woven through slots (3-8). When both sides of visor (10) are attached by this weaving process, the visor assumes a conventional curved-shape as with visors which are permanently attached to caps. In the illustrative example, there are six slots on each side. In other embodiments, there could be more or less slots staying within the scope of this invention.

Referring again to FIG. 2, there is shown a retaining strap (9) attached left and right to both sides of visor (10). During use, retaining strap (9) would fit around the neck of the user, and could be tightened to secure visor (10) as well as the eyeglasses in position on the user. A cord lock, not shown, could be used to secure the retaining strap (9) in a tightened position. The retaining strap (9) could be left in a loosened position to hold visor (10) and the eyeglasses around the neck of the user when not in use.

The above described invention relates to a visor attachable to eyeglasses. While the invention has been described in the manner presently conceived to be most practical, it is apparent to persons ordinarily skilled in the art that modifications may be made thereof within the scope of the invention, which scope is to be accorded the broadest interpretation of claims such as to encompass all equivalents, devices, and methods.

Now, turning to FIG. 3, a second embodiment of the sun visor of the present invention is shown therein. In the second embodiment, the sun visor includes an upper panel 16 and a lower panel 15 that are glued or otherwise secured together. The upper panel 16 includes an upper exposed surface that is relatively slick or low in friction. Typically, the upper panel of material is made of nylon, lycra or other appropriate relatively slick or frictionless material. The lower panel 15 is basically comprised of the same material that forms the sun visor as shown in FIGS. 1 and 2. In particular, the lower panel 15 is comprised of an elastomeric material such as neoprene or rubber. The lower panel 15 includes a lower surface that compared to the upper surface of the upper panel 16 exhibits significant frictional characteristics, i.e. is relatively high in friction. That is, the lower surface of panel 15 tends to grip an object that is moved thereover and tends to inhibit the free sliding of material thereover. The differences in the frictional characteristics of the upper surface 16 and the lower surface 15 play a significant role in the present invention. In the process of threading the temples 14 through the various slots or slits in the sun visor, it is appreciated that the temples will freely slide against the upper panel 16. At the same time, the bottom of the lower panel 15 will tend to grip and retain the temple. Thus, this combination of material as it relates to the slit or slots formed in the sun visor enable the temples to be installed or inserted within the sun visor with relative ease but still provides a strong gripping and retaining action that maintains the sun visor and the eyeglass as an integral unit when in use.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A sun visor for attaching to the temples of eyeglasses comprising:
   a) a cresent shaped bill member having a concave edge forming a back side for placing adjacent to the forehead of an individual and a convex edge forming a front side for extending away from the forehead and wherein the concave and convex edges meet to form right and left sides;
   b) said right side and said left side having slots formed therein that form attachment means that enable the temples to be weaved through the slots so as to secure the temples to the bill member; and
   c) wherein said bill member includes first and second outer exposed panels secured together and wherein said first panel is formed of a material having a relatively low friction surface while the second panel is formed of a different material having a relatively high friction surface such that as the temples are weaved through the slots the first panel with the relatively low friction surface facilitates the weaving process since the temples can easily be moved adjacent the material of the first panel and wherein the relatively high friction material of the second panel tends to grip, retain and secure the temples within the slots once the temples have been weaved into the sun visor.

2. The sun visor of claim 1 wherein the second material having the relatively high friction surface is made from an elastomeric material.

3. The sun visor of claim 2 wherein the material of the first panel is taken from the group consisting of nylon and lycra.

4. The sun visor as set forth in claim 1 further comprising a retaining strap having one end attached to the right side of the sun visor and the other end attached to the left side of the sun visor.

5. The sun visor of claim 1 wherein the slots formed on one side of the sun visor form a set of slots and wherein the individual slots of each set are aligned and are equally spaced.

* * * * *